United States Patent [19]

Horiguchi

[11] Patent Number: 5,633,845

[45] Date of Patent: May 27, 1997

[54] OPTICAL INFORMATION RECORDING AND REPRODUCING APPARATUS HAVING REPRODUCING LIGHT BEAMS RADIATED ONTO REGIONS SITUATED BEHIND AND IN FRONT OF A SPOT FORMED BY A RECORDING LIGHT BEAM

[75] Inventor: Toshio Horiguchi, Hachioji, Japan

[73] Assignee: Olympus Optical Co., Ltd., Tokyo, Japan

[21] Appl. No.: 9,243

[22] Filed: Jan. 26, 1993

[30] Foreign Application Priority Data

Jan. 28, 1992 [JP] Japan ................................ 4-013196

[51] Int. Cl.$^6$ .................................................. G11B 7/095
[52] U.S. Cl. ........................ 369/44.26; 369/44.38; 369/44.41
[58] Field of Search ........................ 369/44.11, 44.37, 369/44.38, 109, 122, 110, 54, 44.12, 44.41, 44.26, 44.39; 235/454, 456

[56] References Cited

U.S. PATENT DOCUMENTS 4,578,786  3/1986  McIntosh et al. .............. 364/44.38 X
5,084,851  1/1992  Noda et al. ..................... 369/44.41 X

FOREIGN PATENT DOCUMENTS 2-61830    3/1990  Japan .
2-227835   9/1990  Japan ........................... 369/44.37

Primary Examiner—W. R. Young
Attorney, Agent, or Firm—Armstrong, Westerman, Hattori, McLeland & Naughton

[57] ABSTRACT

An optical information recording/reproducing apparatus using an optical device to radiate a reproducing light beam originating from a second light source onto regions of an optical recording medium that include a track on an optical recording medium which contains at least a spot formed by a recording light beam originating from a first light source, these regions being situated behind and in front of the spot formed by the recording light beam relative to the direction of movement of the recording light beam. The apparatus also includes a tracking error signal generator for using light of the reproducing light beam reflected from the optical recording medium to generate a tracking error signal. This apparatus uses the generated error signal to help the recording light beam to track a track on the recording medium, thus controlling the position of the spot formed by the recording light beam so that the spot will lie in the middle of the track all the time.

16 Claims, 6 Drawing Sheets

OPTICAL CARD MOVING DIRECTION

OPTICAL CARD MOVING DIRECTION

OPTICAL INFORMATION RECORDING AND REPRODUCING APPARATUS HAVING REPRODUCING LIGHT BEAMS RADIATED ONTO REGIONS SITUATED BEHIND AND IN FRONT OF A SPOT FORMED BY A RECORDING LIGHT BEAM

BACKGROUND OF THE INVENTION

1. Field of the Invention

The present invention relates to an optical information recording/reproducing apparatus for optically recording Information on an optical card or other optical recording medium, and optically reproducing information existing on an optical recording medium. More particularly, this invention is concerned with an optical information recording/ reproducing apparatus having a first light source for generating a recording light beam and a second light source for generating a reproducing light beam.

2. Description of the Related Art

In a dual light source type optical information recording/ reproducing apparatus having both a light source for generating a recording light beam and a light source for generating a reproducing light beam, two light sources are installed Independently. Therefore, the apparatus enables so-called verification that uses a reproducing light beam to check if an immediately preceding recording is acceptable. Compared with a signal light source type apparatus in which spot light must scan a track of an optical recording medium twice In order to record data, the dual light source type apparatus permits a recording speed which is twice as fast. The dual light source apparatus can produce a focus servo signal and a tracking servo signal using a reproducing light beam whose emission is held constant. This results In stable servo control even during recording.

FIG. 1 shows an example of a construction of an optical system for an optical head incorporated in a dual light source type optical information recording/reproducing apparatus of the prior art. A recording light beam generated by a semiconductor laser 1 passes through a collimation lens 2 to become a substantially elliptic beam of parallel rays. The beam of parallel rays is trimmed by a trimmer prism, whereby the longitudinal axis of the ellipse is reduced to provide a circle. Then, the diameter of the trimmed beam of parallel rays is reduced by a circular diaphragm 4 so that the spot size of the recording light beam will be a given value. A circular beam emerging from the diaphragm 4 consists mainly of S-polarized components, which is characteristic of a semiconductor laser. Therefore, the circular beam is almost completely reflected from a reflector of a polarized beam splitter 5, and then converges on the optical axis of an objective 6. The incident light is condensed on an optical card 7 of the objective 6.

FIG. 2 shows a spot of a recording light beam formed on an optical card, and a reproducing light beam image. The recording light beam is condensed by an objective 6, and radiated as a circular light spot 23 on the optical card 7. The light spot 23, whose energy density is concentrated, causes the recording layer of the optical card 7 to show an irreversible thermal change, and forms a recording pit 22.

Multiple tracks 19 Including information recording tracks 20 and track guides 21 are formed on the optical card 7. During recording, the optical card 7 moves in the direction of an arrow a or b in FIG. 2 along the track guides 21. In this state, pulses modulated with information to be recorded are applied to the semiconductor laser 1. The semiconductor laser emits pulsed light in accordance with the modulation. With the emission of pulsed light, pits 22 are formed one after another on the optical card 7. Consequently, information is recorded as an array of pits on the information recording tracks 20.

In an optical head, a light-emitting diode 55 such as an end-face light-emitting diode having a slit type light-emitting surface is installed as a light source of a reproducing light beam. A reproducing light beam generated by the light-emitting diode 55 passes through a collimation lens 9 to become parallel light. Only the P-polarized components of the reproducing light beam are transmitted by the polarized beam splitter 5, and then, these P-polarized components enter a position decentered from the optical axis of the objective 6. Then, the incident light beam of the objective 6 produces, as shown in FIG. 2, an image 56 on the light-emitting surface of the light-emitting diode 55. Then, the image is formed on the optical card 7. The relative distance from the optical image 56 of the reproducing light beam to the recording optical spot 23 is adjusted as follows: when the optical head is assembled and adjusted, the optical axis of the recording light beam that has not yet entered the objective 6 and the optical axis of the reproducing light beam are aligned with each other with an angular difference between them.

The optical image 56 formed on the optical card 7 is reflected regularly from the optical card 7, wherein the quantity of light is modulated depending on the presence or absence of a track guide 21 and a pit 22. The reflected light passes through the objective 6 in the opposite direction, and heads for the polarized beam splitter 5 In the form of substantially parallel light. The reflected light still has P-polarized components because it results from regular reflection. Therefore, the reflected light is almost completely transmitted by the polarized beam splitter 5. The light transmitted by the beam splitter 5 is routed to a condenser lens 15 via a reflecting mirror 14. The light condensed by the condenser lens 15 is divided by a half-mirror 16. Beams of the divided light respectively enter a reproducing/tracking photodetector 17, and a focus photodetector 18 through light receiving surfaces thereof. Thereby, the optical image on the optical card 7 is magnified and projected.

The optical system in the optical head performs what is known as "off-axis focus detection." Specifically, the optical system radiates a reproducing light beam at a position decentered from the optical axis of the objective 6. Therefore, a half-split light-receiving element is placed on the focus photodetector 18 in order to detect movement of an image of a reproducing light beam resulting from deviation of focus.

FIG. 3 shows an optical image projected on a reproducing/tracking photodetector 17. Reproducing light-receiving elements 59 and 60, and tracking light-receiving elements 57 and 58 are placed on the photodetector 17. A magnified image 61 of an optical image 56 from a light-emitting diode 55 is projected on an optical card 7, and formed at an appropriate position on the light-receiving elements without track displacement or defocus. Each of the tracking light-receiving elements 57 and 58 detects a positional change of an image of a track guide 21 resulting from track displacement, as a change in the quantity of received light. A tracking error signal is generated using signals output by these light-receiving elements 57 and 58. During reproduction, each of the reproducing light-receiving elements 59 and 60 detects the presence or absence of a pit on each of two tracks as a change In the quantity of light, and outputs a regenerative signal representing the presence or absence of a pit.

Next, operations for recording will be described. A recording light beam modulated with a recording signal is radiated onto an optical card 7. A light spot 23 projected on the optical card 7 forms a pit 22. At this time, the card 7 is moving in the direction of an arrow a or b in FIG. 3 with respect to the light spot 23. For example, when the optical card 7 is moving in the arrow-a direction, the position of the pit formed 22 is moved toward an optical image 56 of a light-emitting diode. When the pit 22 reaches the optical image 56, the quantity of light in a reproducing light-receiving element 60 on a photodetector 17 changes due to the image of the pit 22. The reproducing light-receiving element 60 detects the change in the quantity of light and outputs a regenerative signal immediately after recording.

Therefore, when the optical card 7 moves in the arrow-a direction, a regenerative signal is produced immediately after recording. In the aforesaid construction, as long as the optical medium moves unidirectionally, verification can be carried out; that is, the acceptability of recording can be checked right away using a reproducing light beam.

However, the conventional dual light source type optical information recording/reproducing apparatus has a disadvantage which is described below. In the dual light source type apparatus, as shown in FIG. 2, a recording light beam spot and a reproducing light beam image are separated by a certain distance. During recording, tracking is done using light of the reproducing light beam reflected from an optical card. Therefore, when a track on the optical card is tilted or skewed relative to the direction of movement of the optical card, a pit which is formed with the recording light beam spot is decentered on a track.

Misregistration occurring when a recording medium is attached to an optical card substrate, poor precision in machining a card holding member used to drive an optical card in the direction In which tracks extend, and/or a split on a card member occurring during operation cause almost all the tracks on an optical card to be linearly skewed. Assuming that a recording light beam spot and a reproducing light beam image are positioned by 40 um apart on an optical card, and the skewing of tracks on the optical card amount to a maximum of 1 mm for the overall length of 85.6 mm of the optical card, the recording light beam spot is decentered by 0.47 µm (=40 µm×1/85.6) in the tracking direction.

SUMMARY OF THE INVENTION

An object of the present invention is to provide an optical information recording/reproducing apparatus capable of generating a tracking error signal in accordance with the skewing or tilting of a track on an optical card relative to the direction of movement of the optical card at a position pinpointed with a recording light beam spot.

Another object of the present invention is to provide an optical information recording/reproducing apparatus capable of positioning a recording pit at a substantially correct position without decentering it from the middle of a track even when the track on an optical recording medium is skewed or tilted relative to the direction of movement of the optical recording medium.

The present invention comprises a first light source for generating a recording light beam that illuminates an optical recording medium and records information; a second light source for generating a reproducing light beam that illuminates the optical recording medium and reproduces information recorded with light reflected from the medium; an optical means located in the optical path of a reproducing light beam so as to radiate the reproducing light beam originating from the second light source onto regions of the recording medium that include at least a track on the optical recording medium, which contains a spot formed by the recording light beam originating from the first light source, these regions being situated behind and in front of the spot formed by the recording light beam, relative to the direction of movement of the recording light beam; and a tracking error signal generating means that uses light of the reproducing light beam reflected from the optical recording medium to generate a tracking error signal that helps the recording light beam to track a track on the recording medium.

The other features and advantages of the present invention will be apparent from the detailed description below.

BRIEF DESCRIPTION OF THE DRAWINGS

FIG. 4 shows a construction of an optical system in an optical head for an optical information recording/reproducing apparatus;

FIG. 5 is an explanatory diagram showing images of a recording light beam spot and reproducing light beam spots formed on an optical card;

FIG. 6 is an explanatory diagram showing reproducing light beam spots projected on a photodetector;

FIG. 7 is a circuit diagram showing a construction of a tracking error signal generating circuit.

DETAILED DESCRIPTION OF THE PREFERRED EMBODIMENTS

An embodiment of the present Invention will be described with reference to the drawings.

Figure 1:
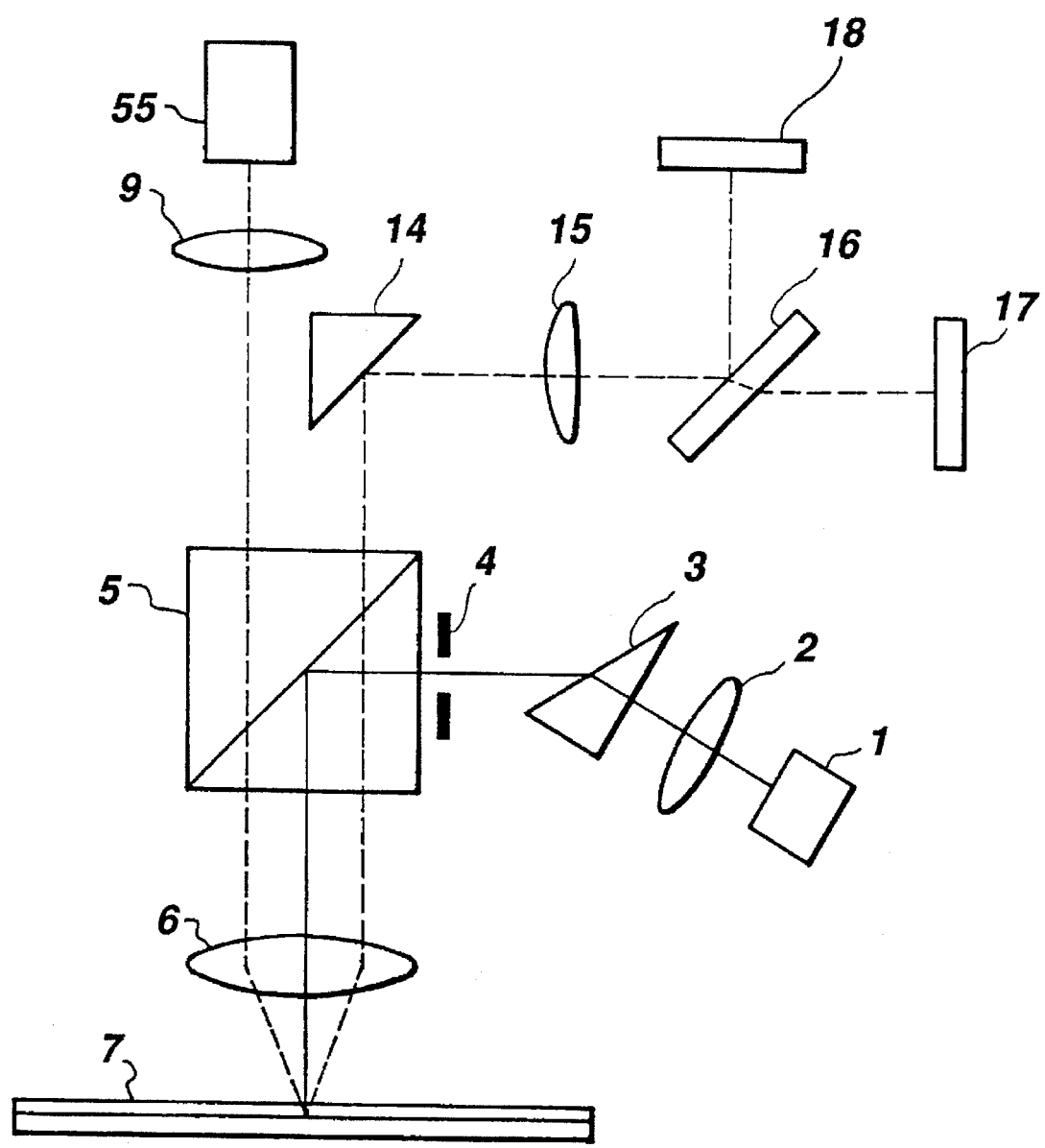
FIG. 1 is an explanatory diagram showing a construction of an optical system in an optical head for an optical information recording/reproducing apparatus of a prior art.
Figure 2:
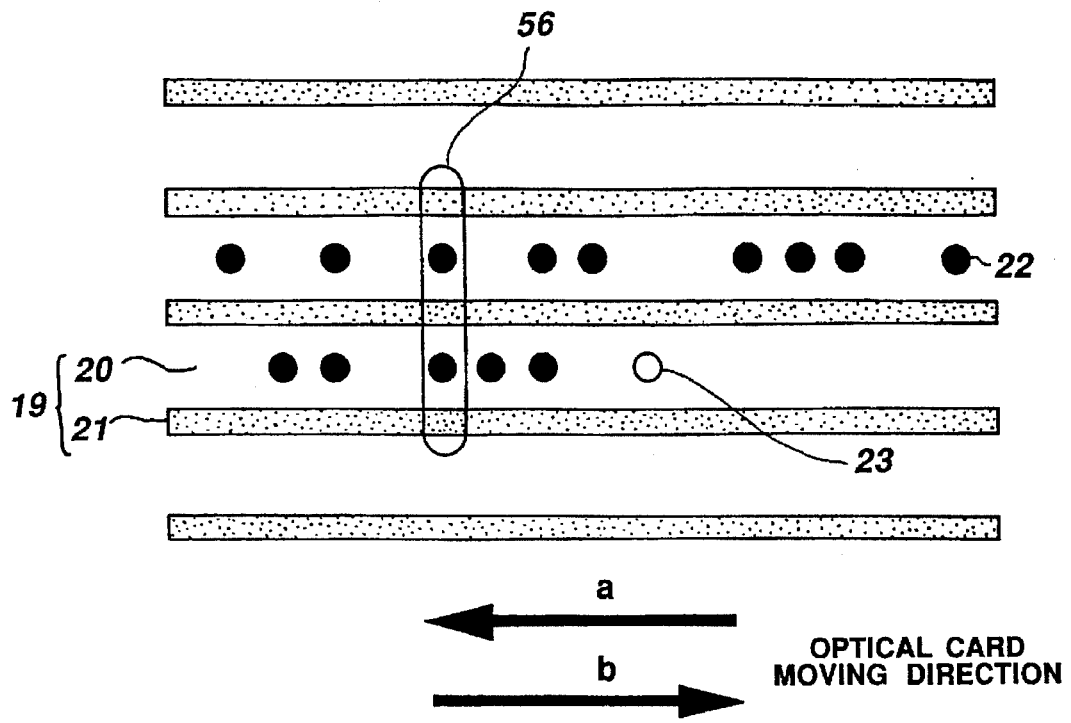
FIG. 2 is an explanatory diagram showing a recording light beam spot on an optical card for an apparatus of a prior art, and a formed image of a reproducing light beam.
Figure 3:
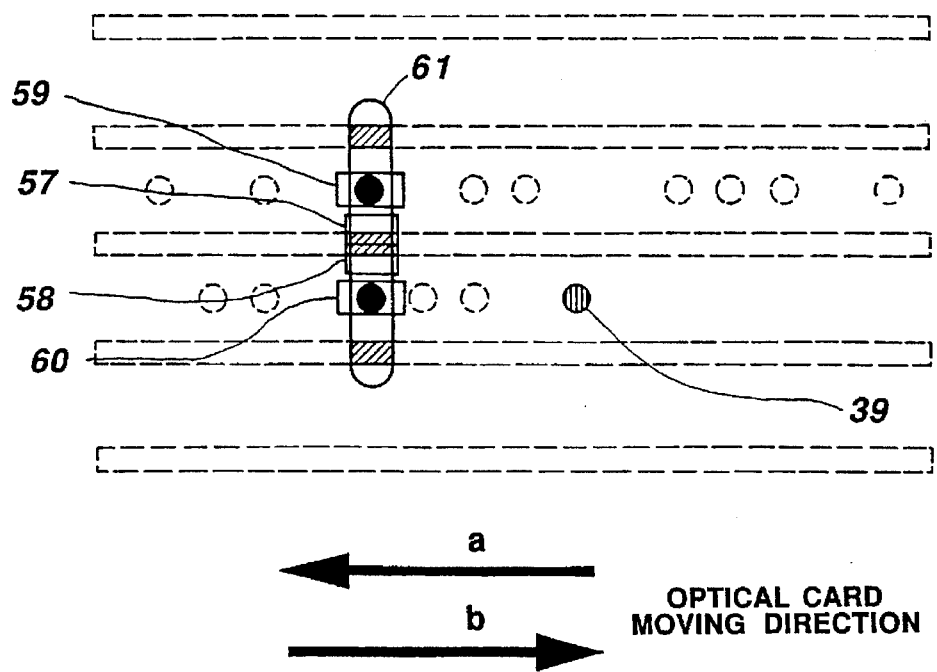
FIG. 3 is an explanatory diagram showing an image of a reproducing light beam projected on a photodetector for an apparatus of a prior art.
Figure 4:
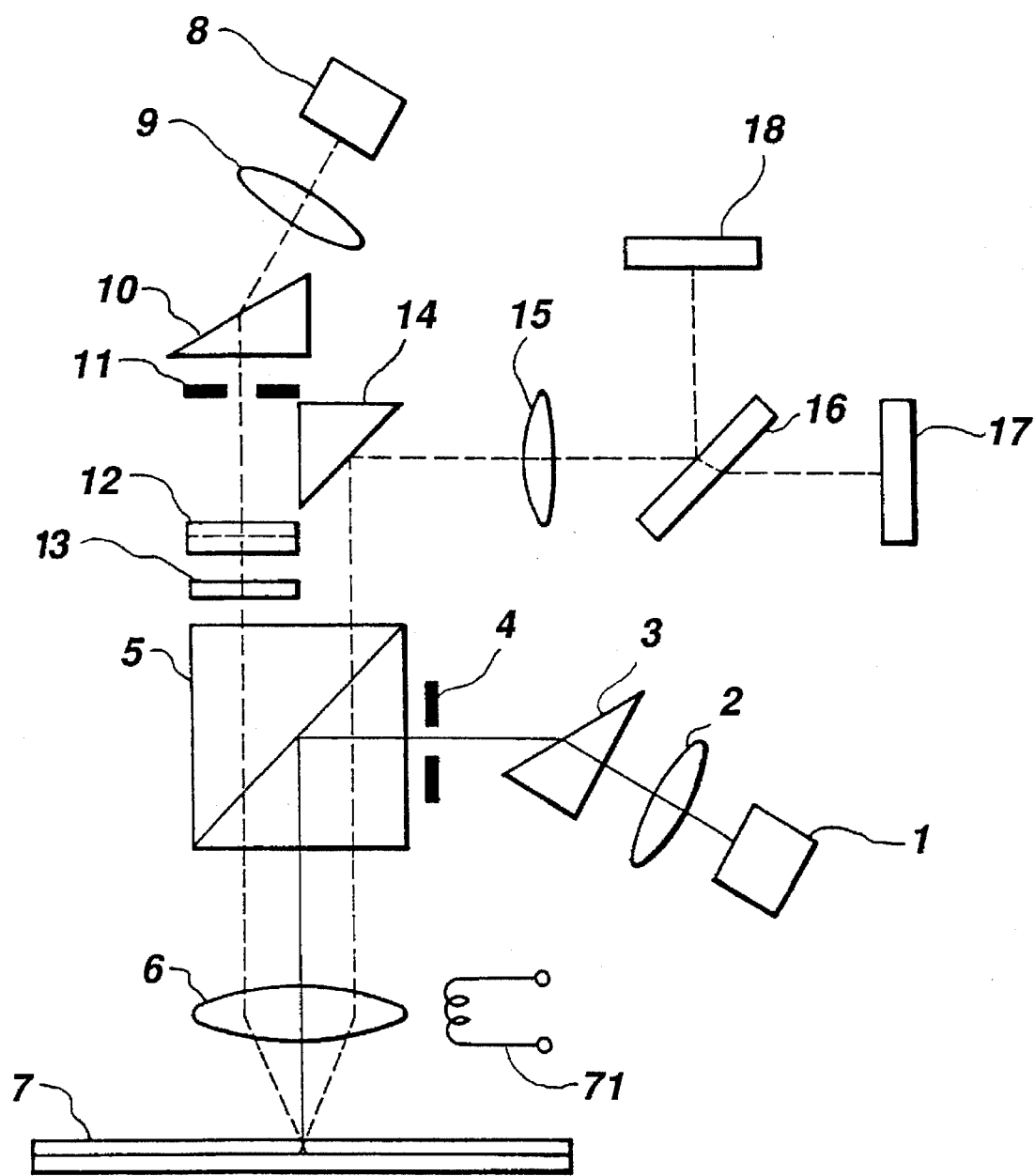
FIGS. 4 to 7 relate to an embodiment of the present invention.

As shown In FIG. 4, an optical head for an optical information recording/reproducing apparatus of an embodiment includes a semiconductor laser 1 serving as a first light source for generating a recording light beam and a semiconductor laser 8 serving as a second light source for generating a reproducing light beam. The optical head further Includes a collimation lens 2 for shaping a recording light beam generated by the semiconductor laser 1 into a beam of parallel rays, a trimmer prism 3 for circular trimming of the beam of parallel rays, and a circular diaphragm 4 for reducing the diameter of a beam so that the spot size of a recording light beam will be a given value.

In the optical head, a circular light beam whose diameter has been reduced by the diaphragm 4 enters a polarized beam splitter 5. The polarized beam splitter 5 almost completely reflects the circular recording light beam and causes the light beam to enter an objective lens 6 at the optical axis thereof. The rays of the incident recording light beam are thereby converged by the objective lens 6 on an optical card 7 serving as an optical recording medium.

The optical head further includes a collimation lens 9 for shaping a reproducing light beam generated by the semiconductor laser 8 into a beam of parallel rays, a trimmer prism 10 for circular trimming of the beam of parallel rays, and a circular diaphragm 11 for reducing the diameter of a beam so that the spot size of the reproducing light beam will be a given value. The optical head further includes a plano-concave cylindrical lens 12 for refracting the circular beam of parallel rays so that light rays lying along one direction in that plane of the circular beam vertical with respect to the optical axis will be refracted to provide a light beam which is slightly divergent in that direction, and a diffraction grating 13 for dividing the slightly divergent beam Into three beams; one zero-order diffracted light beam and two first-order diffracted light beams.

Three beams originating from the diffraction grating 13 enter the polarized beam splitter 5. At this time, the direction of the beam caused to diverge by the cylindrical lens 12 is substantially perpendicular to the direction of the beam diffracted by the diffraction grating 13. The polarized beam splitter 5 transmits the three beams almost completely, and causes the beams to enter the objective lens 6 at positions decentered from the optical axis thereof. The objective lens 6 causes the three reproducing light beams to converge on the optical card 7.

The three light beams converged on the optical card 7 form beam spots on the optical card 7. The beam spots are reflected regularly from the optical card 7, and re-enter the objective 6. The light reflected from the optical card 7 passes through the objective lens 6 in the opposite direction, and then enters the polarized beam splitter 5 in the form of substantially parallel rays of light. Then, the parallel light is transmitted by the polarized beam splitter 5 almost entirely. The light transmitted by the beam splitter 5 passes through a reflecting mirror 14, and heads for a condenser lens 15. The optical head includes a half mirror 16 for dividing light condensed by the condenser lens 15. Beams of the light divided by the half mirror 16 enter the light-receiving surfaces of a reproducing/tracking photodetector 17 and of a focus photodetector 18 respectively. Thus, magnified images of the spots are projected on the optical card 7.

The optical system in the optical head performs what is known as "off-axis focus detection;" that is, a reproducing light beam is converged at a position decentered from the optical axis of the objective 6. Therefore, on the focus photodetector 18, for example, a half-split light-receiving element is placed to detect movement of any of images of reproducing light beam spots resulting from deviation in focus.

Figure 5:
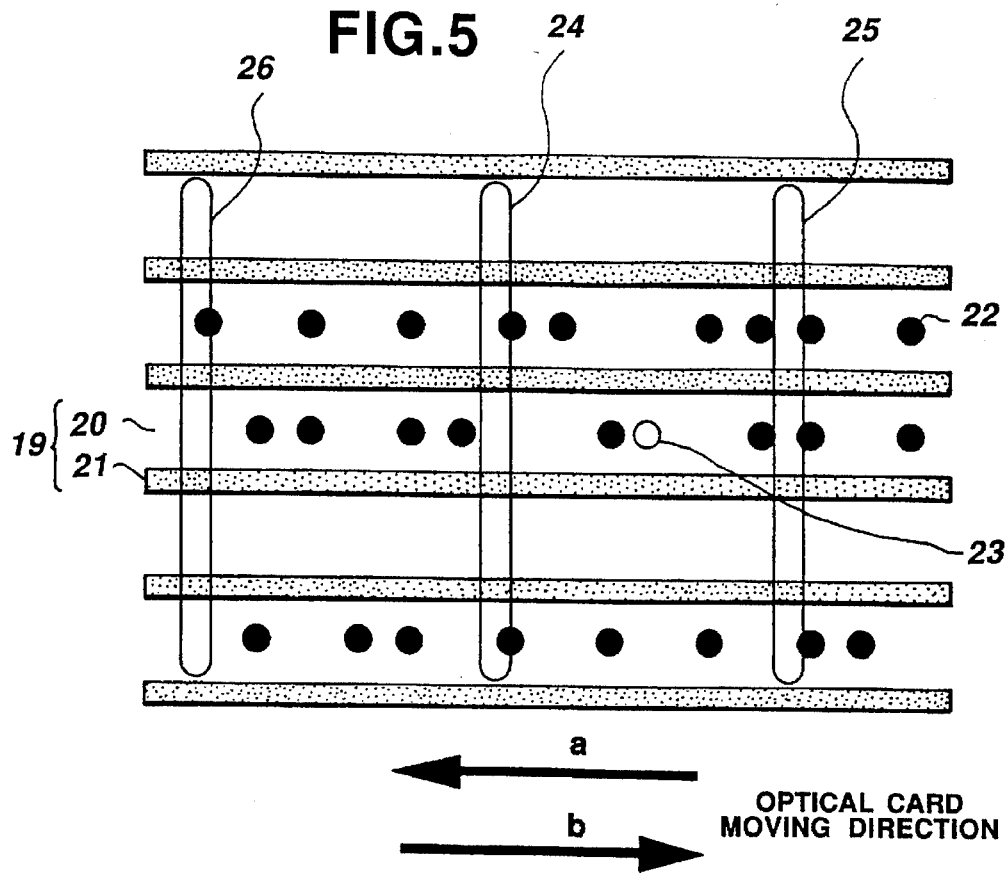

FIG. 5 shows a recording light beam spot and three spots of diffracted reproducing light beams on an optical card 7.

Multiple tracks 19 made up of information recording tracks 20 and track guides 21 are formed on the optical card 7. The rays of light of the recording light beam are converged by an objective 6 to form a recording light beam spot 23 on the optical card 7. Spots 24, 25, and 26 resulting from diffraction of a reproducing light beam are arranged to lie behind and in front of the recording light beam spot 23. The relative positional relationship among these spots is set as follows: the recording light beam spot 23 is located between the spot 24 of the zero-order diffracted light of the reproducing light beam, and either of two spots 25 and 26 of the first-order diffracted light.

In FIG. 5, the recording spot 23 is located between reproducing light beam spots 24 and 25. The recording spot 23 is located substantially in the middle of the space between the reproducing spots 24 and 25. In other words, the recording spot 23 is distanced equally from the respective reproducing spots 24 and 25.

Adjustment for setting the aforesaid positional relationship is carried out when the optical head is assembled and adjusted. That is to say, when the optical head is assembled and adjusted, the optical axis of a recording light beam that has not yet entered the objective 6 and the optical axis of a reproducing light beam are aligned with each other with a relative angular difference between them. The space between each pair of the reproducing spots 24, 25, and 26 on an optical card 7 can be changed by varying the structure of a diffraction grating 3. The spots 24, 25, and 26 can be arranged at irregular intervals.

In this embodiment, the space between the spot 24 marked by the zero-order diffracted light of the reproducing light beam and the respective spots 25 and 26 marked by the first-order diffracted light is set at, for example, 80 um. The space between the recording light beam spot 23, and the respective reproducing light beam spots 24, 25, and 26 is set at, for example, 40 um.

A direction In which the cylindrical lens 12 refracts light is determined so that, as shown in FIG. 5, the directions of extension of magnified reproducing light beam spots 24, 25, and 26 will be perpendicular to the track guides 21 on the optical card 7. This construction permits simultaneous acquisition of the information of the multiple tracks 19 on the optical card 7.

Next, the operations for recording by an optical information recording/reproducing apparatus of this embodiment will be described.

A recording light beam generated by a semiconductor laser 1 becomes a substantially elliptic beam of parallel rays by passing through a collimation lens 2. The beam of parallel rays is trimmed by a trimmer prism 3, whereby only the longitudinal axis of the ellipse is reduced to provide a circle. Then, the diameter of the beam of parallel rays is reduced by a circular diaphragm 4, so that the spot size of the recording light beam will be a given value. The circular beam whose diameter has been reduced consists mainly of S-polarized light components, which is characteristic of a semiconductor laser. Therefore, the circular beam is almost completely reflected by a reflector of a polarized beam splitter 5, and then enters an objective lens 6 at the optical axis thereof. The incident light beam is converged on an optical card by the objective lens 6, and forms a circular light spot 23 shown in FIG. 5. The converged light spot, whose energy density is concentrated, causes the recording layer of the optical card 7 to undergo an irreversible thermal change, and then forms a pit 22.

At this time, the optical card 7 is moving in the direction of an arrow a or b in FIG. 5 along track guides 21. The optical card 7 is moved by a well-known carrier mechanism. In this well-known mechanism, a carrier base for securing a card on a carrier belt is laid between a pair of pulleys, and either of the pulleys is driven by a motor to move the carrier base In parallel with the tracks of the card.

When provided with pulses modulated with information to be recorded, the semiconductor laser 1 emits pulsed light in accordance with the modulation. With the light emission, pits 22 are generated one after another. Finally, information is recorded as an array of pits on information recording tracks 20.

On the same time, a reproducing light beam generated by a semiconductor laser 8 becomes a substantially elliptic beam of parallel rays while passing through a collimation lens 9. Then, the beam of parallel rays is shaped by a shaping prism 10, whereby the minor axis of the ellipse is enlarged to provide a circle. After being shaped, the reproducing light beam passes through a circular diaphragm 11. Therefore, the diameter of the beam of parallel rays is reduced so that the spot size of the beam will be a given value. A circular beam of parallel rays thus obtained is refracted by a plano-concave cylindrical lens 12, whereby the rays lying along one direction in the plane of the circular beam perpendicular to the optical axis are refracted to provide a beam that is slightly divergent in that direction. The slightly divergent beam is divided into three beams by a diffraction grating 13; that is, a zero-order diffracted light beam and two first-order diffracted light beams. Each of the three beams consists mainly of P-polarized components, which is characteristic of a semiconductor laser. The three beams, therefore, are transmitted by a polarized beam splitter 5 almost completely. The three light beams transmitted by the beam splitter 5 converge at positions off-centered of the optical axis of an objective 6. Then, the three beams are condensed on an optical card 7 by the objective 6. The zero-order and first-order diffracted light beams form three magnified spots that extend in the direction in which the light is diverged by the cylindrical lens 12 (See FIG. 5).

Then, spots 24, 25, and 26 formed on the optical card 7 by diffracted parts of the reproducing light beam are reflected regularly, and the quantities of light are modulated depending on the presence or absence of a track guide 21 and a pit 22 on the optical card 7. The reflected light passes through the objective 6 in the opposite direction, then heads for the polarized beam splitter 5 in the form of substantially parallel light.

The reflected light keeps almost all of its P-polarized components because it results from regular reflection. Therefore, the reflected light is transmitted by the polarized beam splitter 5 almost entirely, and then routed to a condenser lens 15 via a reflecting mirror 14. A light condensed by the condenser lens 15 is divided by a half mirror 16. The beams of divided light respectively enter a reproducing/tracking photodetector 17 and a focus photodetector 18 through light receiving surfaces thereof. The light beams projected on the light-receiving surfaces of the photodetectors carry magnified images of the spot images projected on the optical card.

Figure 6:
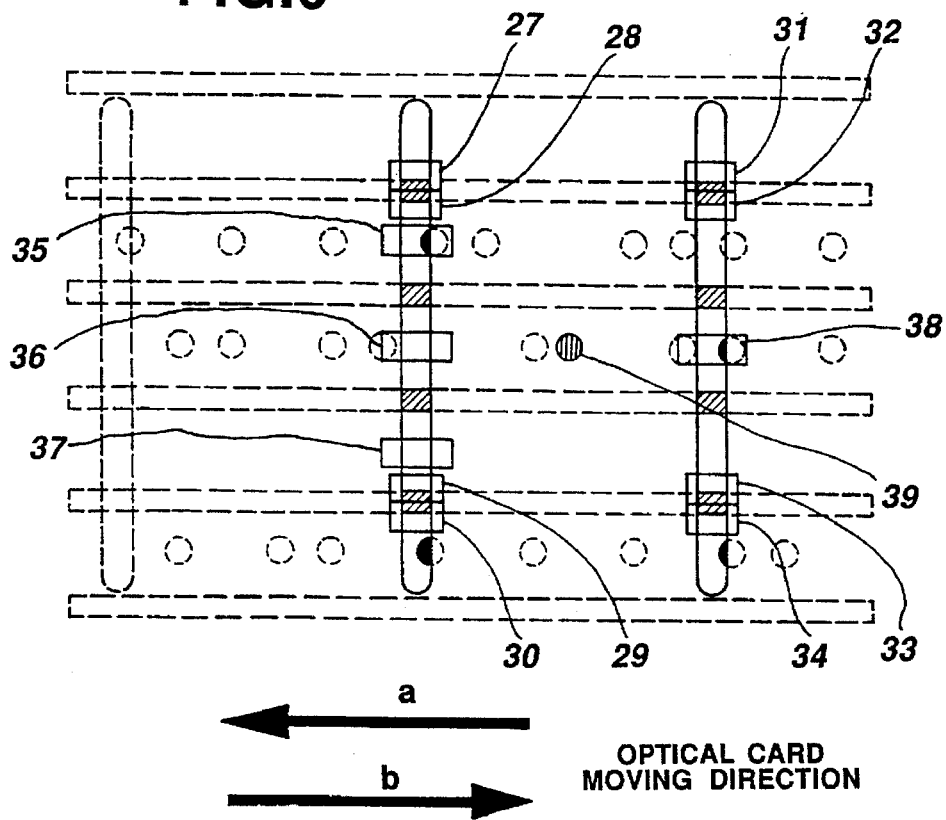

FIG. 6 shows spot images of zero-order and ± first-order diffracted light of a reproducing light beam projected on a photodetector 17.

On the photodetector 17, tracking light-receiving elements 27, 28, 29, 30, 31, 32, 33, and 34, and reproducing light-receiving elements 35, 36, 37, and 38 are arranged. The spot images are formed at appropriate positions on these light-receiving elements without track displacement and defocus.

Each of the reproducing light-receiving elements 35, 36, and 37 detects the presence or absence of a pit on each of three tracks as a change in the quantity of light on the track, then outputs a regenerative signal. The pairs of tracking light-receiving elements 27 and 28, 29 and 30, 31 and 32, or 33 and 34 detect a positional change of an image of a track guide 21 resulting from track displacement as changes in the quantities of received light. The detected output signals are computed to obtain differences. Eventually, a tracking error signal is produced.

Each of the reproducing light-receiving elements 36 and 38 detects an image of a pit 22 that has been recorded immediately before, and then outputs a regenerative signal.

The regenerative signal is used for verification, whereby the acceptability of recording is checked right away. In this apparatus, when the optical card 7 moves in either the direction of an arrow a or b, a pit 22 formed by the recording light beam spot 23 is scanned by the reproducing light beam spot 24 or 25. By this means, this apparatus performs verification.

Figure 7:
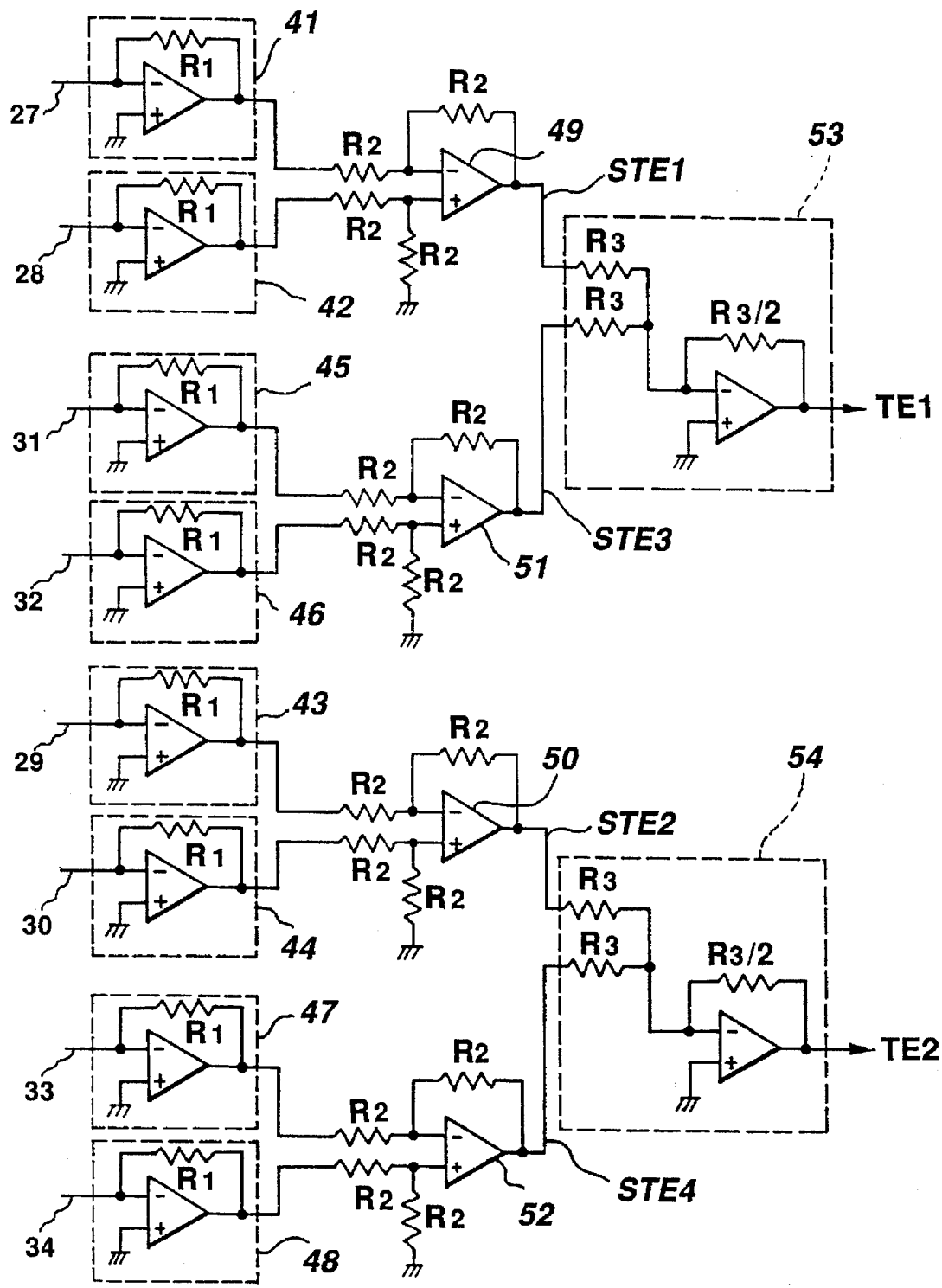

FIG. 7 shows an example of the construction of a tracking error signal generating circuit. The error signal generating circuit generates a tracking error signal using the detected outputs of four pairs of light-receiving tracking elements 27 to 34.

I/V amplifiers 41 to 48 for current-voltage conversion are attached to the output terminals of the light-receiving elements 27 to 34, and these I/V amplifiers convert the output currents of the light-receiving elements into voltages. Operational amplifiers 49 to 52, each of which computes a difference between input signals, are connected to the output terminals of the I/V amplifiers 41 and 42, 43 and 44, 45 and 46, and 47 and 48. The outputs of the light-receiving elements 27 and 28, 29 and 30, 31 and 32, and 33 and 34, which have been converted into voltages, are processed by the operational amplifiers 49 to 52. Then, differential signals are calculated for the individual pairs. The calculated differential signals are provided as sub-tracking error signals STE1, STE2, STE3, and STE4 for the respective pairs of light-receiving elements 27 and 28, 29 and 30, 31 and 32, and 33 and 34.

Average computing units 53 and 54 for computing averages of the sub-tracking error signals STE1 and STE3, and STE2 and STE4 are connected to the output terminals of the operational amplifiers 49 and 51, and 50 and 52. An average computed by the average computing unit 53 or 54 is supplied as a tracking error signal TE1 or TE2.

In the aforesaid construction, output currents detected by the respective pairs of the tracking light-receiving elements 27 to 34 are converted into voltages by the I/V amplifiers 41 to 48. Differences are computed by the operational amplifiers 49 to 52, then provided as the sub-tracking error signals STE1, STE2, STE3, and STE4 for the respective pairs of light-receiving elements.

Two of the pairs of light-receiving elements, that is either 27 and 28, and 31 and 32, or 29 and 30, and 33 and 34, receive the light carrying the image of one and the same track guide. Therefore, STE1 and STE3 on the one hand, or STE2 and STE4 on the other provide sub-tracking error signals for the image of respective track guides. The average computing unit 53 averages the STE1 and STE3 to provide an average signal TE1. The average computing unit 54 averages the STE2 and STE4 to provide an average signal TE2. The average signal TE1 or TE2 is supplied as a tracking error signal.

Then, a tracking actuator 71 shown in FIG. 4 drives the objective 6 in order to nullify the tracking error signal. In this embodiment, either TE1 or TE2 is applied to the tracking actuator 71. Therefore, the embodiment may not necessarily have a construction that outputs both TE1 and TE2. To be more specific, when the photodetectors shown in FIG. 6 and the tracking error signal generating circuit shown in FIG. 7 are involved, components related to tracking error signals TE1 and TE2, which are not used, can be omitted. When both TE1 and TE2 are needed, as described in conjunction with an example later, all the constructions shown in FIGS. 6 and 7 are necessary.

Images of two reproducing light beam spots 24 and 25 located on either side of a recording light beam spot 23 on an optical card 7 are, as described previously, received in the form of light by pairs of light-receiving elements 27 and 28, and 31 and 32. The light-receiving elements 27 and 28, and 31 and 32 are paired, and each pair corresponds to one of the two track guides, and respective members of each pair are positioned at equal distances from an image of a recording light beam spot 39 on either side thereof. A sub-tracking error is obtained by calculating the difference between signals received by each pair of light-receiving elements. Then, a tracking error signal generating circuit averages the sub-tracking errors pertaining to the same track guide to provide a tracking error signal TE1. The above arrangement of light-receiving elements and the above computation and generation of a tracking error signal enables, as described later, this apparatus to record a recording pit in the middle of a track.

Assume that an information recording track 20 and a track guide 21 are skewed by 1 mm in the direction of movement of an optical card 7 over an overall length of 85.6 mm of the card. Provided that a sub-tracking error signal STE1 detected by a pair of light-receiving elements 27 and 28 represents zero, a space between a spot 24 formed by the zero-order diffracted light of a reproducing light beam and a spot 25 formed by the first-order diffracted light measures 80 µm on the optical card. Therefore, a sub-tracking error signal STE3 detected by the pair of light-receiving elements 31 and 32 represents a track displacement of 0.9 µm (=80 µm×1/85.6).

Then, since an output of an average computing unit 53 is an average (tracking error signal) TE1 of the two sub-tracking error signals, TE1 represents a value deviating by 0.45 um from a normal value. That is to say, the tracking error signal generating circuit of this embodiment generates a tracking error signal in accordance with the skewing or tilting of a track on an optical card at a position pinpointed by a recording light beam spot.

Depending on the average of two sub-tracking error signals, a recording light beam spot is servo-controlled. To be more specific, the recording light beam spot, which is located in the middle of the space between respective pairs of light-receiving elements, is servo-controlled so as to shift by 0.45 µm in the same direction as that in which a signal STE3 shifts. Consequently, a recording pit is recorded in the middle of a track. That is to say, in this embodiment, an average of sub-tracking error signals sent from a pair of light-receiving elements located on the same track is checked to detect displacement of a track guide 21. Therefore, a recording light beam spot is always located in the middle of a track, and a recording pit is always recorded exactly in the middle of the track regardless of any displacement of the track.

In the aforesaid embodiment, outputs of light-receiving elements 27, 28, 31, and 32 (STE1 and STE3) are used to generate a tracking error signal. The present invention is not restricted to the aforesaid construction. Outputs of light-receiving elements 29, 30, 33, and 34 may be used to generate a tracking error signal. In other words, either of the constructions may be employed and either TE1 or TE2 may be adopted as a tracking error signal.

Alternatively, this embodiment may be constructed to use both TE1 and TE2 signals. According to this construction, when an abnormality deriving from dust, flaws, or defects occurs in one of tracking error signals that is in use, the signal is switched to the other signal that is not in use. In a construction described in U.S. patent application Ser. No. 673,817 filed by the present applicant, two tracking error signals are supplied, and if an abnormality occurs in either of the signals, the signal is switched to the other signal in which no abnormality occurs. This construction can be applied in the present invention.

As described above, in an apparatus of the present invention, a spot formed by a reproducing light beam is positioned behind and in front of a recording light beam spot on an optical recording medium, and the reflected light of the reproducing light beam emerging from two regions is analyzed to help a recording light beam spot to perform tracking. Therefore, even if an optical card is skewed, the recording light beam spot can be placed in the middle of a track. This embodiment has the same advantages even when a track on an optical card is tilted with respect to the direction of movement of the optical card. Thereby, in this embodiment, a recording pit can be recorded at a precise position without being decentered from the middle of a track.

Figure 8:
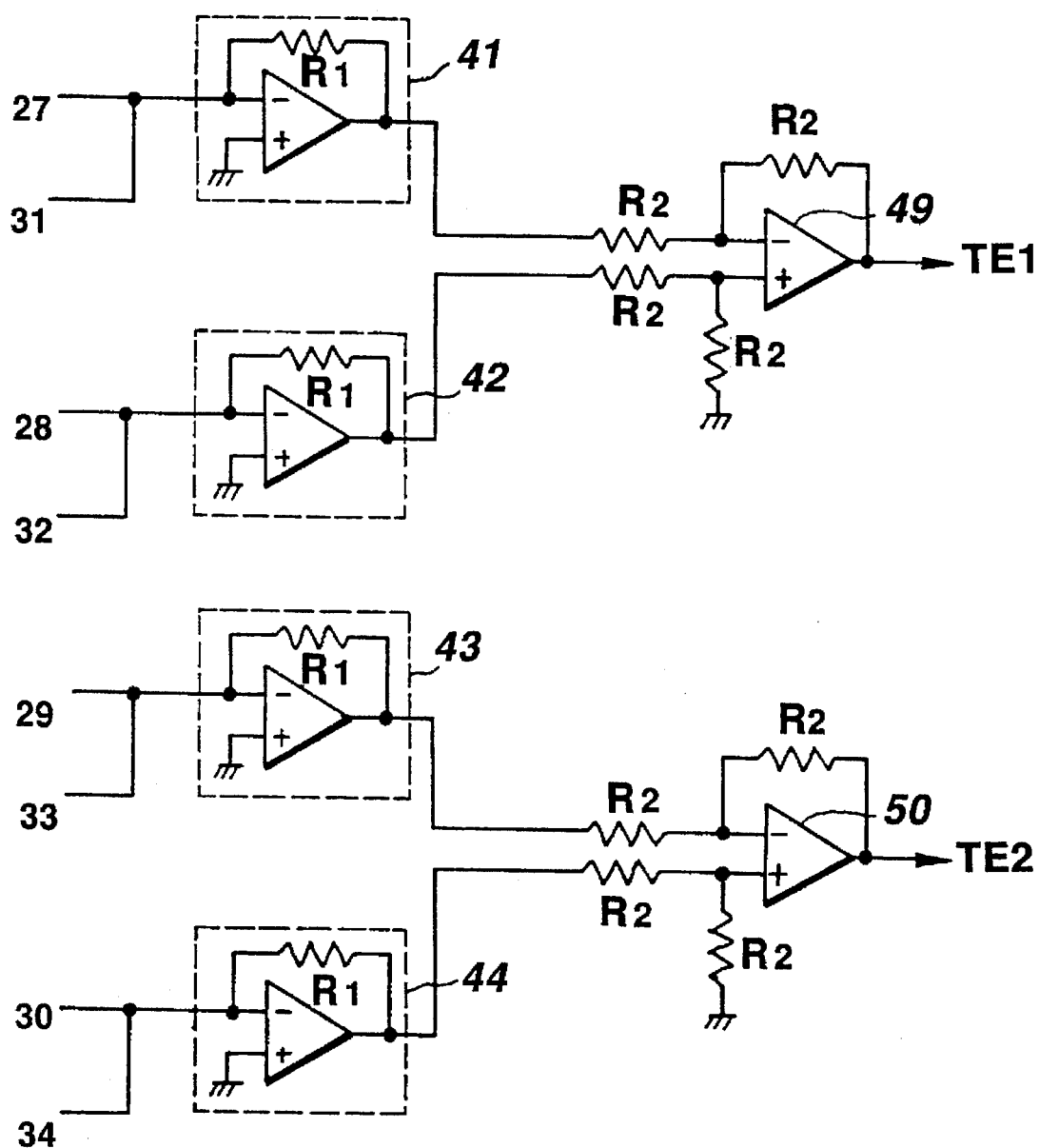
FIG. 8 is a circuit diagram showing a construction of a variant of a tracking error signal generating circuit.

The present invention is not limited to the aforesaid embodiment but can be constructed differently. FIG. 8 shows an example of a construction of a variant of a tracking error signal generating circuit.

In the circuit shown in FIG. 7, outputs of tracking light-receiving elements are converted from currents to voltages by I/V amplifiers 41 to 48. Then, the voltages are computed by operational amplifiers 49 to 52, and differences are obtained. Then, the obtained differences are averaged by average computing units 53 and 54. Thus, a tracking error signal is produced. In a circuit of this variant shown in FIG. 8, outputs of pairs of light-receiving elements are added up in units of current. Then, the results of addition are converted into voltages by I/V amplifiers 41 to 44. Then, the voltages are processed by operational amplifiers 49 and 50, and differences are obtained. Thus, a tracking error signal TE1 or TE2 is produced.

Components identical to those shown in FIG. 7 are assigned the same numerals. The description will be omitted. The above variant, similarly to the aforesaid embodiment, provides a tracking error signal in accordance with the skewing of a track. In this embodiment, the tracking error signal represents the skewing of a track at a position pinpointed with a recording spot.

In the previous embodiment, a reproducing light beam is radiated onto three tracks simultaneously. Thus, recording data is acquired from the three tracks and displacement is detected with respect to two track guides. The number of tracks onto which the light beam is radiated is not limited to three. Sub-tracking error signals are acquired by detecting positional changes of images on light-receiving elements on a track guide. Sub-tracking error signals may be acquired using any other method. A focus photodetector may be installed in the photodetector, to which a reproducing light-receiving element and a tracking light-receiving element are allocated. The focus detection method used may be a non-point aberration method or a knife edge method instead of an off-axis method.

A reproducing light beam generated using a semiconductor laser is divided into two elongated beams which form spots on either side of a recording light beam. An optical system may be constructed using an LED as a second light source, so that a single beam will illuminate a wide area Including the right and left sides of the recording light beam. Even when a single beam from an LED is used to illuminate a wide area, similarly to when two beams are radiated using a semiconductor laser, a tracking error signal concerning either the front or back area of the recording light beam can be produced. In this construction, the beam may have any shape as long as the beam can illuminate the areas on the right and left of the recording light beam.

In the present invention, it will be apparent that a wide range of embodiments can be constructed in accordance with the spirit of the present invention. This invention is limited to the appended claims but not restricted to any specific embodiment.

What is claimed is:

1. An optical information recording/reproducing apparatus, comprising:
   a first light source for generating a recording light beam that illuminates an optical recording medium, for recording information;
   a second light source for generating a reproducing light beam that illuminates said optical recording medium, and uses light reflected from the medium to reproduce recorded information;
   an optical means located on a light path of said reproducing light beam so as to radiate said reproducing light beam originating from said second light source to a plurality of regions on said optical recording medium that include at least one track and at least one track guide on said optical recording medium, wherein said track contains a spot of a recording light beam originating from said first light source, said regions being situated behind and in front of said recording light beam spot relative to the direction of movement of said recording light beam; and
   a tracking error signal generating means that uses light of said reproducing light beam reflected from said optical recording medium to generate a tracking error signal which helps said recording light beam to track a center portion of a recording track on said recording medium,
   wherein said tracking error signal generating means includes a plurality of photodetector means that form an image from said optical recording medium onto which said reproducing light beam is radiated at positions on respective sides of a spot formed by said recording light beam, each said photodetector means being arranged so as to receive an image centered upon at least one said track guide in one of said regions; and
   a tracking error signal calculating means for processing signals detected by said plurality of photodetector means and outputting a tracking error signal representing an amount of skew of said recording track at a position of said recording light beam spot.

2. An optical information recording/reproducing apparatus according to claim 1, further comprising a tracking servo control means that uses a tracking error signal generated by said tracking error signal generating means to control the position of a spot of said recording light beam on said recording medium.

3. An optical information recording/reproducing apparatus according to claim 1, wherein said second light source is a semiconductor laser; wherein:
   said optical means includes a diffraction grating for dividing a reproducing light beam originating from said semiconductor laser into a plurality of diffracted light rays which will form spots on respective sides of a spot of said recording light beam on said optical recording medium.

4. An optical information recording/reproducing apparatus according to clam 1, wherein a spot formed by a light beam irradiated onto said optical recording medium for detecting a plurality of tracking error signals is arranged symmetrically with said spot formed by said recording light beam on said optical recording medium.

5. An optical information recording/reproducing apparatus according to claim 1, wherein said second light source is a light-emitting diode; wherein:
   said optical means radiates a single reproducing light beam originating from said light-emitting diode onto a region of said optical recording medium including back and front portions of a spot formed by said recording light beam.

6. An optical information recording/reproducing apparatus according to claim 1, wherein said tracking error signal generating means generates a first tracking error signal produced with light reflected from a front portion of a spot formed by said recording light beam and a second tracking error signal produced with light reflected from a back portion of the spot of said recording light beam; and
   said first tracking error signal and said second tracking error signal are averaged to generate a third tracking error signal.

7. An optical information recording/reproducing apparatus according to claim 1, wherein said plurality of photodetector means are arranged on the same track.

8. An optical information recording/reproducing apparatus according to claim 1, wherein said plurality of photodetector means are pairs of photodetector means.

9. An optical information recording/reproducing apparatus according to claim 8, wherein said tracking error signal calculating means calculates a difference between the outputs of each member of each pair of said plurality of photodetector means, and averages these difference outputs to produce a tracking error signal.

10. An optical information recording/reproducing apparatus according to claim 9, wherein both members of each pair of said plurality of photodetector means are arranged on the same track; and
    said tracking error signal calculating means calculates a difference between the outputs of the two members of each pair of said plurality of photodetector means, and averages these difference outputs to produce a tracking error signal.

11. An optical information recording/reproducing apparatus according to claim 1, wherein said plurality of photodetector means are arranged symmetrically with respect to said spot formed by said recording light beam being incident on a plane including said plurality of photodetector means as a center.

12. An optical information recording/reproducing apparatus according to claim 1, wherein said plurality of photodetector means are arranged with said spot formed by said recording light beam being incident on a plane including said plurality of photodetector means as a center, located in parallel with respect to a direction of movement of said spot formed by said recording light beam, and positioned at approximately equal distances from the direction of movement of said spot formed by said recording light beam.

13. An optical information recording/reproducing apparatus according to claim 1, wherein said plurality of photodetector means include at least two first photodetectors that receive light reflected from a first track and at least two second photodetectors that receive light reflected from a second track which is different from said first track,
    wherein said tracking error signal calculating means calculates a first tracking error signal from said first photodetector and a second tracking error signal from said second photodetector.

14. An optical information recording/reproducing apparatus according to claim 13, further comprising outputting means for selecting and outputting said first tracking error signal and second tracking error signal.

15. An optical information recording/reproducing apparatus according to claim 1, wherein said tracking error signal calculating means calculates a first tracking error signal from outputs of said photodetector means for forming an image of said optical recording medium obtained by irradiating said reproducing light beam positioned in front of said spot formed by said recording light beam, calculates a second tracking error signal from outputs of said photodetector means for forming an image of said optical recording medium obtained by irradiating said reproducing light positioned at the rear of said spot formed by said recording light beam, and calculates a tracking error signal performing tracking control of said recording light beam based on a sum signal of the first tracking error signal and second tracking error signal.

16. An optical information recording/reproducing apparatus, comprising:

a first light source for generating a recording light beam that illuminates an optical recording medium, for recording information;

a second light source for generating a reproducing light beam that illuminates said optical recording medium, and uses light reflected from the medium to reproduce recorded information;

an optical means located on a light path of said reproducing light beam so as to radiate said reproducing light beam originating from said second light source to regions on said optical recording medium that include at least one track and at least one track guide on said optical recording medium, wherein said track contains a spot of a recording light beam originating from said first light source, said regions being situated behind and in front of said recording light beam spot relative to the direction of movement of said recording light beam; and a tracking error signal generating means that uses light of said reproducing light beam reflected from said optical recording medium to generate a tracking error signal which helps said recording light beam to track a recording track on said recording medium, wherein said tracking error signal generating means includes a plurality of photodetector means that form an image from said optical recording medium onto which said reproducing light beam is radiated at positions on respective sides of a spot formed by said recording light beam, wherein said plurality of photodetector means have a first photodetector means for detecting said reproducing light beam positioned in front of said spot formed by said recording light beam and a second photodetector means for detecting said reproducing light beam positioned at the rear of said spot formed by said recording light beam, said first photodetector means and said second photodetector means are arranged so as to receive a same image centered upon said guide track, and wherein said first photodetector means and said second photodetector means are arranged with said spot formed by said recording light beam being incident upon a plane including said first photodetector means and said second photodetector means as a center, located in parallel with respect to a direction of movement of said spot formed by said recording light beam and positioned at approximately equal distances from the direction of movement of said spot formed by said recording light beam;

a tracking error signal calculating means that processes signals detected by said plurality of photodetector means and outputs a tracking error signal calculated in accordance therewith, wherein said tracking error signal calculating means includes means for calculating a first tracking error signal by calculating outputs from said first photodetector means, means for calculating a second tracking error signal by calculating outputs from said second photodetector means, and means for calculating a third tracking error signal by averaging said first tracking error signal and said second tracking error signal wherein said third tracking error signal represents an amount of skew of said recording track at a position of said recording light beam spot.

* * * * *